United States Patent [19]  
Denda et al.

[11] 3,758,611  
[45] Sept. 11, 1973

[54] METHOD OF REMOVING ALDEHYDES
[75] Inventors: Rokuro Denda; Toshio Kawaguchi, both of Kurashiki, Japan
[73] Assignee: Kuraray Co. Ltd., Okayama Prefecture, Japan
[22] Filed: Sept. 24, 1971
[21] Appl. No.: 183,709

[30] Foreign Application Priority Data
Sept. 29, 1970 Japan.............................. 45/85438

[52] U.S. Cl. .......................... 260/681.5 R, 260/681
[51] Int. Cl. .............................................. C07c 7/00
[58] Field of Search ...................... 260/681, 681.5 R

[56] References Cited
UNITED STATES PATENTS
3,673,265 6/1972 Swodenk et al. ................... 260/681
3,560,586 2/1971 Kronig et al. ....................... 260/681
3,060,240 10/1962 Hellin et al. ........................ 260/681

Primary Examiner—Paul M. Coughlan, Jr.
Attorney—Sherman & Shalloway

[57] ABSTRACT

A method of removing aldehydes from an organic layer separated from a condensate of a reaction mixture resulting from the vapor phase catalytic decomposition of 4,4-dimethyl-1,3-dioxane to isoprene, which comprises bringing the organic layer and water into liquid-liquid contact at an elevated temperature of 45°C. or higher to extract the aldehydes out of said organic layer.

4 Claims, No Drawings

METHOD OF REMOVING ALDEHYDES

This invention relates to a method of removing aldehydes from a condensed organic layer resulting after the vapor phase catalytic decomposition reaction of 4,4-dimethyl-1,3-dioxane to isoprene.

It is well known that isoprene can be prepared by decomposing 4,4-dimethyl-1,3-dioxane in the vapor phase in the presence of an appropriate catalyst such as a solid phosphoric acid catalyst. Separation and recovery of isoprene from the gaseous reaction mixture resulting from the foregoing decomposition reaction are generally performed by cooling the gaseous reaction mixture to condense it, separating the resulting condensate into an organic layer and a water layer, and distilling the organic layer. The organic layer is generally composed of about 10 – 80 percent by weight of isoprene, about 1 – 15 percent by weight of isobutene, about 15 – 80 percent by weight of unreacted 4,4-dimethyl-1,3-dioxane and about 5 – 15 percent by weight of other components including water and trace amounts of various impurities. The organic layer obtained after the decomposition reaction of 4,4-dimethyl-1,3-dioxane usually contains about 0.1 – 1.2 percent by weight of aldehydes consisting mainly of formaldehyde, which have not been transferred to the water layer when the condensate of the decomposition reaction mixture has been separated into the organic layer and the water layer. The above-mentioned formaldehyde includes both monomeric formaldehyde and formaldehyde complexes which come from monomeric formaldehyde and other compounds by weak chemical reactions and are considered to be easily transformed to monomeric formaldehyde or hydrates thereof by rise of temperature, phase transition from liquid to vapor, chemical reaction with $Na_2SO_3$ or Schiff's reagent, and the like. These formaldehyde complexes are also hereinafter referred to as formaldehyde.

When the foregoing organic layer containing the aldehydes is distilled as it is, troubles are frequently experienced in carrying out a continuous operation of the distillation step because of polymerization of the formaldehyde. It is, therefore, desired to remove the aldehydes, such as formaldehyde, from the foregoing organic layer prior to submitting it to distillation. However, there have been no reports to date concerning the removal of the aldehydes from the organic layer.

The object of the present invention is to provide a method of effectively removing the harmful aldehydes, especially formaldehyde, from the condensed organic layer obtained after the vapor phase catalytic decomposition reaction of 4,4-dimethyl-1,3-dioxane in the preparation of isoprene therefrom.

The distribution coefficient relative to water at room temperature of monomeric formaldehyde and hydrates thereof in a high purity isoprene-monomeric formaldehyde and hydrates thereof -water system is about 1000. Further, the distribution coefficient relative to water at room temperature of monomeric formaldehyde and hydrates thereof in a high purity 4,4-dimethyl-1,3-dioxane (MDO)-monomeric formaldehyde and hydrates thereof-water system is also as high as about 20. On the other hand, the distribution coefficient relative to water at room temperature of formaldehyde in the organic layer-water system is as low as about 0.4 – 0.5 due to the complexity and the variety of the components of the organic layer which is obtained after the decomposition reaction of 4,4-dimethyl-1,3-dioxane. Accordingly, when one attempts to remove the aldehydes by extraction with water at room temperature as in the usual extraction operation, an extremely high tower and an exceedingly large amount of water are required. Therefore, the operation at room temperature is very uneconomical.

It has now been suprisingly found that the distribution coefficient relative to water of the aldehydes consisting mainly of formaldehyde in the liquid-liquid extraction system comprising the aforesaid organic layer to which has been added shows an abrupt increase as the temperature is raised. For example, the distribution coefficient varies depending upon the temperature of the system as follows: 1.0 at 45°C., 1.5 at 60°C., 3.8 at 80°C., and 18.0 at 90°C.; this demonstrates that as the temperature is higher, the distribution coefficient rapidly becomes greater.

Thus, the present invention provides a method of removing the aldehydes from the organic layer separated from the condensate of the reaction mixture resulting from the vapor phase catalytic decomposition of 4,4-dimethyl-1,3-dioxane to isoprene, which comprises bringing such organic layer and water into liquid-liquid contact at an elevated temperature of 45°C. or higher to extract the aldehydes out of the organic layer.

According to the method of the present invention, the tower height (number of plates or stages) of the extraction tower and the amount of water required can be greatly reduced in carrying out the extraction and removal of the aldehydes from the organic layer on a commercial scale, and the extraction and removal operation can be carried out more effectively as well as economically, as compared with the conventional extraction operation which is carried out at room temperature.

As is apparent from the foregoing description, the efficiency of extraction becomes higher as the temperature becomes higher. However, higher temperatures in the liquid-liquid extraction require higher pressures of the system so that a mixed system of the organic layer and water is prevented from boiling. Besides, the use of higher temperatures results in increase in losses of the valuable components by the polymerization thereof. It is, therefore, advisable to use temperatures not exceeding 100°C. in the extraction. Particularly suitable temperatures are in the range of 60° to 90°C.

Furthermore, the extraction according to the method of the invention is preferably carried out under a pressure higher than the vapor pressure of the mixed system of the organic layer and water to ensure that the liquid-liquid contact of the organic layer and water is accomplished. At an extraction temperature ranging from 50° to 100°C., the extraction according to the present method can be carried out under a pressure of about 0.5 to about 6.0 kg/cm² gauge depending upon the temperature.

The amount of water to be used for carrying out the extraction can be varied over a wide range depending upon such factors as the concentration of the aldehydes in the organic layer, the height of the extraction tower, the state of mixing of the organic layer and water, the extraction temperature and the like. For example, when an organic layer containing 0.769 percent by weight, based on the organic layer, of aldehydes (hereinafter referred to as aldehyde content) is treated at a flow rate of 10 liters per hour in an extraction tower of the packed column type as in Example 1 hereinafter given, the operation of an extraction tower of 5 meters in height at 80°C. can be carried out with the weight ratio of water to the organic layer of at least 2. If the amount of water fed is increased to a weight ratio of water to the organic layer of 3, an extraction tower of 4 meters in height will suffice. On the other hand, when the operation temperature is about 60 °C., a weight ratio of water to the organic layer of at least 2 should be used with a tower height of 8-9 meters, and a weight ratio of water to the organic layer of at least 3 should be used with a tower height of 6-7 meters.

As the extraction tower, any type of extraction tower such as a tower of the packed column type, or a tower of the plate column type which is usually used in ordinary extraction operations, can be used. It is desirable to use an extraction tower which makes it possible to bring the organic layer into good contact with water. The method of the invention can be carried out either in a continuous or batchwise manner, as desired.

The invention will be hereinafter explained with reference to the following examples which are intended for illustrative purpose only.

Examples I–V

A gaseous reaction mixture resulting from the vapor phase catalytic decomposition of 4,4-dimethyl-1,3-dioxane in the presence of a solid phosphoric acid catalyst was condensed and separated into a water layer and an organic layer which was composed of 30.1 percent by weight of isoprene, 5.0 percent by weight of isobutene, 52.9 percent by weight of 4,4-dimethyl-1,3-dioxane, 0.769 percent by weight of aldehydes and 11.3 percent by weight of other components including water and trace amounts of other impurities. To the organic layer 500 ppm of p-tert.-butyl catechol were added as a polymerization inhibitor, and then the organic layer was continuously introduced into the bottommost stage of a packed column type extraction tower of 5.0 meters in height and 100 millimeters in inner diameter at a rate of 10 liters per hour while water was continuously introduced into the top stage of the extraction tower at a rate of 20 liters per hour, and the extraction was carried out at a temperature of 80°C., under a gauge pressure of 2.5 kg/cm$^2$, and with a residence time of 30 minutes. As a result, the amount of aldehydes in the organic layer discharged from the top of the tower declined to 0.046 percent by weight, and the efficiency of extraction of aldehydes (weight of the aldehydes extracted in the water/weight of the aldehydes contained in the organic layer before the extraction treatment × 100) was 92.7 percent. The results obtained at the indicated extraction temperatures and pressures are shown in Table 1:

TABLE 1

| Examples | Temperature (°C.) | Pressure (kg/cm$^2$G) | Extraction efficiency (%) | Amount of Isoprene polymerized (ppm based on isoprene fed) |
|---|---|---|---|---|
| I | 80 | 2.5 | 92.7 | <300 |
| II | 90 | 3.0 | 99.8 | <1000 |
| III | 50 | 1.0 | 81.3 | <100 |
| IV | 60 | 1.5 | 87.5 | <100 |
| V | 70 | 2.0 | 91.2 | <100 |

When for comparison the extraction was carried out at room temperature (12°C.) and under normal atmospheric pressure, the extraction efficiency was only 36.1 percent. To attain an extraction efficiency of above 90 percent by the extraction at room temperature and normal pressure, a tower of unlimited height would be required. Thus it is actually impossible to obtain results of above 90 percent extraction efficiency by the extraction at room temperature and normal pressure.

EXAMPLE VI

Example 1 was repeated except that the aldehyde content of the organic layer was changed to 1.0 percent by weight. As a result, the amount of aldehydes contained in the organic layer discharged from the top of the tower declined to 0.06 percent by weight. The extraction efficiency in this case was 92.7 percent.

What is claimed is:

1. A method of removing aldehydes from an organic layer separated from a condensate of a reaction mixture resulting from a vapor phase catalytic decomposition of 4,4-dimethyl-1,3-dioxane to isoprene, which comprises, prior to subjecting said organic layer to distillation for recovering of isoprene in a column, bringing said organic layer and water into liquid-liquid contact at an elevated temperature of at least 45°C. under a pressure higher than the vapor pressure of said organic layer and water mixture system, to extract said aldehydes out of said organic layer.

2. The method of claim 1, wherein the extraction is carried out at a temperature of 50° to 100°C. under a pressure of about 0.5 to about 6.0 kg/cm$^2$ gauge.

3. The method of claim 1, wherein said extraction is carried out at a temperature not exceeding 100°C.

4. The method of claim 3, wherein said extraction is carried out at a temperature ranging from 60° to 90°C.

* * * * *